Patented July 13, 1943

2,324,198

UNITED STATES PATENT OFFICE 2,324,198

LITHOGRAPHIC PLATE PREPARATION

James P. Danehy, Cleveland Heights, and John H. Newland, Athens, Ohio, assignors to Harris-Seybold-Potter Company, Cleveland, Ohio, a corporation of Ohio No Drawing. Application July 2, 1941, Serial No. 400,794

18 Claims. (Cl. 95—5.4)

In the usual procedure of making lithographic plates, the plate, after suitable cleaning, is coated with dichromate sensitized albumin and is dried. After exposure of the plate, the developing ink is applied and the plate is developed, and is treated with water which washes away the unexposed portions of the coating and the developing ink thereon. Then the plate is etched by applying a plate-etching solution such as ammonium dichromate-phosphoric acid and gum arabic solution, to form a water-receptive surface in the non-image portions. A long-standing objection to albumin has been its tendency to deteriorate rapidly, and usually there is considerable waste due to incomplete solubility for the preparation of the coating, and to spoilage; and furthermore the sensitivity of this material to light varies with the relative humidity at the time of exposure, and great care is necessary if successful results are obtained. Fundamentally, albumin is deficient in inherent water-repellancy, and carelessness by the operator may lead to loss of the image. Again, albumin yields half tone dots which are weak on their edges, and such dots decrease in size during printing, and there is a tendency for small dots to be lost entirely. Albumin is also objectionable on account of its odor and its milky texture. In accordance with the present invention, it now becomes possible to prepare lithographic plates with elimination of the noted disadvantages of albumin, and with outstanding advantages of superior water-repellancy and ink-retentiveness, stability and excellent printing results.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

For the preparation of plates in accordance with the invention, the plate is counter-etched to remove oxide, dirt, etc., as usual, and is washed with water. The prepared surface is coated with a degraded protein product prepared by heating a certain kind of protein with an organic solvent, or dispersing agent as it may more properly be called, as the protein is a colloid, and thereafter removing the dispersing agent. The protein which is heated and degraded in accordance with the process is casein from milk, or the similarly-acting "vegetable casein" as in seeds such as soya bean, etc., i. e. a protein of casein type. While various solvents or dispersing agents such as resorcinol, glycerol, acetamide, etc. may be employed, we prefer ethylene glycol, or in some cases other glycol, as propylene glycol, etc. In illustration of the preparation of the degraded protein product, we prefer to mix one part of casein with three or four parts of ethylene glycol and heat the mixture, with stirring, rapidly. Depending somewhat upon the size of the container and efficiency of the application of heat, there may be some variation in the length of time required to reach a desirable treating temperature. A satisfactory rate is to reach a temperature of about 165° C. in about ninety minutes. A temperature of about 165° C. is generally sufficient as a maximum, and when this point has been reached, the contents of the reaction vessel should be discharged or cooled. Desirably the reaction mixture is quickly cooled to about 110° C., cooling being required only to an extent sufficient to avoid further degradation of the protein. Further cooling below 110° C. may be employed if desired but results in gelation which renders further processing difficult. Then the degraded protein product is separated from the dispersing agent. Preferably this is accomplished by mixing the liquid mass with two or three times its volume of a precipitating agent, i. e. an agent which is miscible with the dispersing agent and is non-solvent for the protein product, such as anhydrous acetone or less desirably ether, or the lower alcohols. By stirring, the solid degraded protein product is separated as a fine powder from the liquid phase containing the dispersing agent and precipitating agent. At this stage the product may be ground to a state of finer division, as in a ball mill, if desired. The product is then filtered, washed with more of the precipitating agent, and preferably vacuum dried. If desired, before subjecting the liquid mass from the heating zone to the action of the precipitating agent, the solvent or glycol may be distilled off in part, and then the mixing with the precipitating agent may be carried out.

The product as dried is a light yellow powder. In the treatment, the initially high molecular weight protein is broken down into a simpler molecular structure of lower molecular weight. The solvent or dispersing agent being neutral, the break-down is not of the drastic type involved in boiling with such hydrolytic agents as alkalies or acids, and the product gives the general tests of protein. Water and ammonia are given off in a measurable degree. The product differs from the initial protein in having new solubility characteristics, and viscosity relations. It is soluble in 70–85 per cent aqueous ethyl alcohol, in 70–85 per cent aqueous acetone, and in dilute ammonia, to the extent of about 95 per cent. Solution occurs within a few hours, depending upon the concentration, and the solution may be put through a fine filter or may be centrifuged to remove the insoluble portion. The concentration varies, depending upon particular requirements. A convenient proportion where employing dilute alkalin solution is for instance 435 parts of water and 15 parts of concentrated ammonia, 28 per cent, and in this there may be dissolved 50 parts by weight of the powdered protein product. The solution may be stirred for about an hour. Generally then it is desirable to allow it to stand quietly for several days to a week during which time the small insoluble portion, which however is thoroughly dispersed, separates out as a gray gelatinous precipitate which is removed by suitable means such as centrifuging. Such a clarified solution has a concentration of about 9.5 per cent, specific gravity of 1.03, and viscosity of 5-7 centipoises at 20° C., and a pH of about 9.5. If a dichromate solution as for sensitizing, be added to the ammonia water and powdered mixture shortly after it is made up, a peculiarity is that the dichromate causes a precipitate. But if the solution is aged for twenty-four hours such precipitate does not occur. A concentration in ammonia solution as of the proportion above-mentioned is ordinarily suitable for the addition of ammonium dichromate sensitizer and direct use in coating the plates, but where desired the solution may be further diluted to provide a lower concentration, the minimum which is satisfactory being generally on the order of about 5 per cent. Or, as desired, the product may be dissolved in proportions to form solutions of considerably higher concentration, which may subsequently be reduced by appropriate dilution as required. For the sensitizing, the amount of ammonium dichromate for instance may be generally one part to three parts of protein reaction product. With the dichromate added, the pH of the solution for coating is about 7.0, whereas the pH of the initially clarified solution is around 9.5. The viscosity range as stated, is rather critical. Below 5 centipoises the solutions as coated on the plates yield images that are undesirably weak, and above 7 centipoises the solutions are so strong as to be prone to cause trouble in developing.

For the preparation of plates in accordance with the invention, the plate is counter-etched to remove oxide, dirt, etc., and is washed with water. And the prepared surface may be coated with the protein reaction product solution. Plates thus directly coated, after their exposure and development are characterized by strength and accurate reproduction of images. However, there is a tendency for the protein film to be adsorbed on the non-image portion of the plate and eventually take up ink so as to result ultimately in so-called "scum" and dirty printed sheets. This tendency can be avoided by pre-treating the plate before the protein coating material is applied, and this may involve a "pre-etch" by a solution of a water soluble natural gum, as for instance gum arabic, ghatti gum, tahla gum, etc., and one or more slightly acidifying salts such as ammonium, potassium or sodium salts of the common mineral acids as nitric, phosphoric, hydrochloric, etc. Desirably, we may employ a solution of gum arabic, mono-ammonium phosphate and ammonium nitrate. For example, desirable proportions are 600 cc. of a 14° Bé. solution of gum arabic, and 22 grams of mono-ammonium phosphate and 22 grams of ammonium nitrate to each 600 cc. of water. The pre-etching solution is brushed over the surface of the plate for a minute or somewhat more. Then the plate is washed with water, and while still damp a coating of the sensitized degraded protein solution is applied and the plate may be whirled and dried. The pre-etch treatment prevents adsorption of the degraded protein coating on the plate. The coated sensitized lithographic plate is exposed in usual manner, and is developed by a developing ink and in water until the unexposed portion of the surface coating is removed leaving the light hardened areas as the image portion of the plate. In cases where the protein product was applied as a solution in alcohol-water the developing and after-treating solutions may advisably be of alcohol-water basis similarly, and likewise in the case of acetone-water coating. After developing, preferably the plate is then treated with a weakly alkalin solution, such as one-half ounce of sodium carbonate per gallon of water or one ounce of sodium acid carbonate per gallon of water, this treatment being carried on until the grain of the plate in the non-image areas is sharp and clean, as occurs for example usually in one or two minutes. The surface is then rendered water-receptive on its appropriate areas by the customary etching solutions as well known for that purpose.

This application is a continuation, in part and as to common subject matter of our application Serial No. 297,870, filed October 4, 1939.

Other modes of applying the principle of the invention may be employed, change being made as regards the details described, provided the features stated in any of the following claims, or the equivalent of such, be employed.

We therefore particularly point out and distinctly claim as our invention:

1. A process of making lithographic plates, which comprises counter-etching the plate, washing, pre-etching the plate by a solution of gum arabic and mono-ammonium phosphate and ammonium nitrate, washing, providing a coating of light sensitized product of casein heated with a glycol to degradation of the casein to about the extent as by bringing the temperature of the mixture up to about 165° C. in about ninety minutes and then being separated from the glycol, such product being soluble in 70-85 per cent aqueous alcohol or acetone, exposing, developing, treating with an alkalin solution, and etching.

2. A process of making lithographic plates, which comprises counter-etching the plate, washing, pre-etching the plate by a solution of gum arabic and mono-ammonium phosphate and ammonium nitrate, washing, providing a coating of light sensitized product of casein heated with an inert organic dispersing agent to degradation of the casein to about the extent as by bringing the temperature of the mixture up to about 165° C. in about ninety minutes and then being separated from the dispersing agent, such product being soluble in 70-85 per cent aqueous alcohol or acetone, exposing, developing, treating with an alkalin solution, and etching.

3. A process of making lithographic plates, which comprises counter-etching the plate, washing, pre-etching the plate by a solution of gum arabic and mono-ammonium phosphate and ammonium nitrate, washing, providing a coating of light sensitized product of a protein of casein type heated with an inert organic dispersing agent to degradation of the protein to about the extent as by bringing the temperature of the mixture up to about 165° C. in about ninety minutes and then being separated from the dispersing agent, such product being soluble in 70-85 per cent aqueous alcohol or acetone, exposing, developing, treating with an alkalin solution, and etching.

4. In a process of making lithographic plates, exposing a plate having a surface of light sensitized product of casein heated with an inert organic dispersing agent to degradation of the casein to about the extent as by bringing the temperature of the mixture up to about 165° C. in about ninety minutes and then being separated from the dispersing agent to the formation of a product soluble in 70-85 per cent aqueous ethyl alcohol or acetone, developing, treating with an alkalin solution, and etching.

5. In a process of making lithographic plates, exposing a plate having a surface of light sensitized product of a protein of casein type heated with an inert organic dispersing agent to degradation of the protein to about the extent as by bringing the temperature of the mixture up to about 165° C. in about ninety minutes and then being separated from the dispersing agent to the formation of a product soluble in 70-85 per cent aqueous ethyl alcohol or acetone, developing, treating with an alkalin solution, and etching.

6. In a process of making lithographic plates, pre-etching the plate by a solution of gum arabic and mono-ammonium phosphate and ammonium nitrate, washing, and providing a coating of light sensitized product of a protein of casein type heated with an inert organic dispersing agent to degradation of the protein to about the extent as by bringing the temperature of the mixture up to about 165° C. in about ninety minutes and then being separated from the dispersing agent, such products being soluble in 70-85 per cent aqueous ethyl alcohol or acetone.

7. In a process of making lithographic plates, treating the plate with a pre-etch solution of a water-soluble natural gum and a slightly acidifying salt, and providing a coating of light sensitized product of casein heated with a glycol to degradation of the casein to about the extent as by bringing the temperature of the mixture up to about 165° C. in about ninety minutes and then being separated from the glycol.

8. In a process of making lithographic plates, treating the plate with a pre-etch solution of a water-soluble natural gum and a slightly acidifying salt, and providing a coating of light sensitized product of a protein of casein type heated with an inert organic dispersing agent to degradation of the protein to about the extent as by bringing the temperature of the mixture up to about 165° C. in about ninety minutes and then being separated from the dispersing agent.

9. A process of preparing lithographic plates, which comprises providing thereon a printing surface of the product of casein heated with a glycol to degradation of the casein to about the extent as by bringing the temperature of the mixture up to about 165° C. in about ninety minutes and then being separated from the glycol to the formation of a product having a primary viscosity characteristic of 5-7 centipoises as dissolved to the amount of fifty parts by weight of powdered protein in about four hundred thirty-five parts of water and fifteen parts of 28 per cent ammonia solution, and finally light-hardening such product in the presence of a sensitizer.

10. A process of preparing lithographic plates, which comprises providing thereon a printing surface of the light hardened product of a sensitizing agent and a protein of casein type heated with a glycol to degradation of the protein to about the extent as by bringing the temperature of the mixture up to about 165° C. in about ninety minutes and then being separated from the glycol to the formation of a product having a primary viscosity characteristic of 5-7 centipoises as dissolved to the amount of fifty parts by weight of powdered protein in about four hundred thirty-five parts of water and fifteen parts of 28 per cent ammonia solution.

11. A lithographic plate having its image areas of light-hardened product of a sensitizing agent and casein heated with a glycol to degradation of the casein to about the extent as by bringing the temperature of the mixture up to about 165° C. in about ninety minutes and then being separated from the glycol.

12. A lithographic plate having its image areas of light-hardened product of a sensitizing agent and casein heated with an inert organic dispersing agent to degradation of the casein to about the extent as by bringing the temperature of the mixture up to about 165° C. in about ninety minutes and then being separated from the dispersing agent.

13. A lithographic plate having its image surfaces of light-hardened product of a sensitizing agent and a protein of casein type heated with glycol to degradation of the protein to about the extent as by bringing the temperature of the mixture up to about 165° C. in about ninety minutes and then being separated from the glycol.

14. A lithographic plate having its image surfaces of light-hardened product of a sensitizing agent and a protein of casein type heated with an inert organic dispersing agent to degradation of the protein to about the extent as by bringing the temperature of the mixture up to about 165° C. in about ninety minutes and then being separated from the dispersing agent.

15. A lithographic plate having a pre-etching of gum arabic and mono-ammonium phosphate and ammonium nitrate, and a coating of the product of casein heated with a glycol to degradation of the casein to about the extent as by bringing the temperature of the mixture up to about 165° C. in about ninety minutes and then being separated from the glycol.

16. A lithographic plate having a pre-etching of gum arabic and mono-ammonium phosphate and ammonium nitrate, and a coating of the product of casein heated with an inert organic dispersing agent to degradation of the casein to about the extent as by bringing the temperature of the mixture up to about 165° C. in about ninety minutes and then being separated from the dispersing agent.

17. A lithographic plate having a pre-etching of a water-soluble natural gum and a slightly acidifying salt, and a coating of the product of casein heated with a glycol to degradation of the casein to about the extent as by bringing the temperature of the mixture up to about 165° C. in about ninety minutes and then being separated from the glycol.

18. A lithographic plate having a pre-etching of a water-soluble natural gum and a slightly acidifying salt, and a coating of the product of a protein of casein type heated with an inert organic dispersing agent to degradation of the protein to about the extent as by bringing the temperature of the mixture up to about 165° C. in about ninety minutes and then being separated from the dispersing agent.

JAMES P. DANEHY.
JOHN H. NEWLAND.